United States Patent
Garner

(10) Patent No.: US 6,467,996 B1
(45) Date of Patent: Oct. 22, 2002

(54) POLYSTYRENE BEADS FOR DRAINAGE FIELDS

(75) Inventor: Wavern L. Garner, Memphis, TN (US)

(73) Assignee: Rapac, Inc., Oakland, TN (US)

( * ) Notice: Subject to any disclaimer, the term of this patent is extended or adjusted under 35 U.S.C. 154(b) by 0 days.

(21) Appl. No.: 09/288,036

(22) Filed: Apr. 8, 1999

(51) Int. Cl.[7] .............................................. E02B 11/00
(52) U.S. Cl. ........................................ 405/50; 405/36
(58) Field of Search .......................... 405/36, 43, 50, 405/284, 286, 262; 446/116; 206/814; 428/120, 159, 316.6

(56) References Cited

U.S. PATENT DOCUMENTS

| | | |
|---|---|---|
| 3,104,085 A | 9/1963 | Skladany |
| 3,167,600 A * | 1/1965 | Worman ...................... 405/50 |
| 3,188,264 A | 6/1965 | Holden |
| 3,233,414 A * | 2/1966 | Hansen, Jr. et al. .......... 405/50 |
| 4,077,154 A * | 3/1978 | Muller .......................... 46/26 |
| 4,166,875 A | 9/1979 | Bussey, Jr. |
| D255,875 S | 7/1980 | Atkins |
| 4,215,166 A | 7/1980 | Bussey, Jr. |
| D258,267 S | 2/1981 | Atkins |
| 4,411,555 A | 10/1983 | Minvielle et al. |
| 4,474,505 A | 10/1984 | Minvielle et al. |
| 4,514,453 A | 4/1985 | Bussey, Jr. |
| 4,606,965 A | 8/1986 | Bussey |
| 4,983,068 A * | 1/1991 | Kozak et al. ................. 405/36 |
| 4,990,116 A * | 2/1991 | Chen ........................... 446/124 |
| 5,015,123 A | 5/1991 | Houck et al. |
| 5,028,470 A | 7/1991 | Reichenecker |
| D319,392 S | 8/1991 | Ring |
| 5,051,028 A * | 9/1991 | Houck et al. ................. 405/45 |
| 5,061,218 A * | 10/1991 | Garage et al. .............. 446/102 |
| 5,069,647 A * | 12/1991 | Zuviria ........................ 446/127 |
| 5,160,785 A | 11/1992 | Davidson, Jr. |
| 5,215,490 A * | 6/1993 | Szoradi ....................... 446/115 |
| 5,254,389 A | 10/1993 | Tether |
| 5,267,863 A * | 12/1993 | Simmons, Jr. ................. 434/96 |
| 5,482,491 A * | 1/1996 | Kichijyo ..................... 446/112 |
| 5,515,975 A | 5/1996 | Jarvis et al. |
| 5,595,458 A * | 1/1997 | Grabhorn ..................... 405/258 |
| 5,928,052 A * | 7/1999 | Buscher ....................... 446/124 |
| 6,053,661 A * | 4/2000 | Lewis .......................... 405/36 |
| 6,062,772 A * | 5/2000 | Perkins ........................ 405/284 |

FOREIGN PATENT DOCUMENTS

DE 2755833 A * 7/1978 ........... E02D/17/20

* cited by examiner

*Primary Examiner*—Thomas B. Will
*Assistant Examiner*—Alexandra K. Pechhold
(74) *Attorney, Agent, or Firm*—David A. Tamburro

(57) ABSTRACT

A loose fill lightweight plastic aggregate for a preassembled drainage line unit. The bead comprises a central portion, at least three legs extending from each of the top and bottom of said central portion, a plurality of channels each defined by adjacent ones of said legs, the width of said legs being greater than the width of said channels. A rib protrides laterally from each of the sides of the central portion. In the drainage unit, the beads maintain a substantial void space for flow of waste water and also provide maximum surface area for bacterial breakdown of sewage wastes.

16 Claims, 2 Drawing Sheets

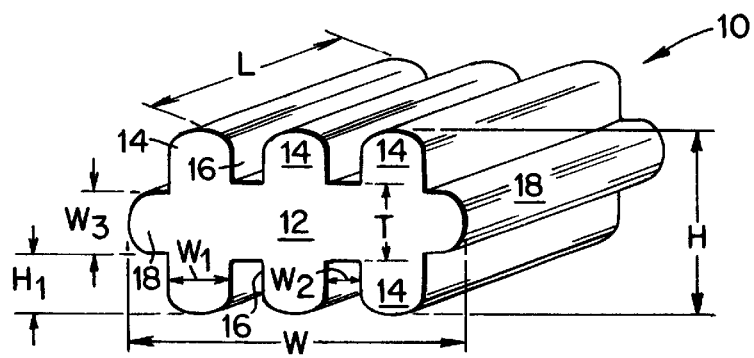
Fig.1
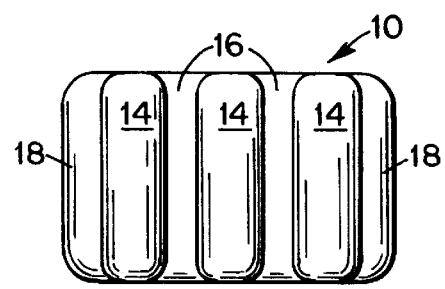
Fig.2
Fig.3
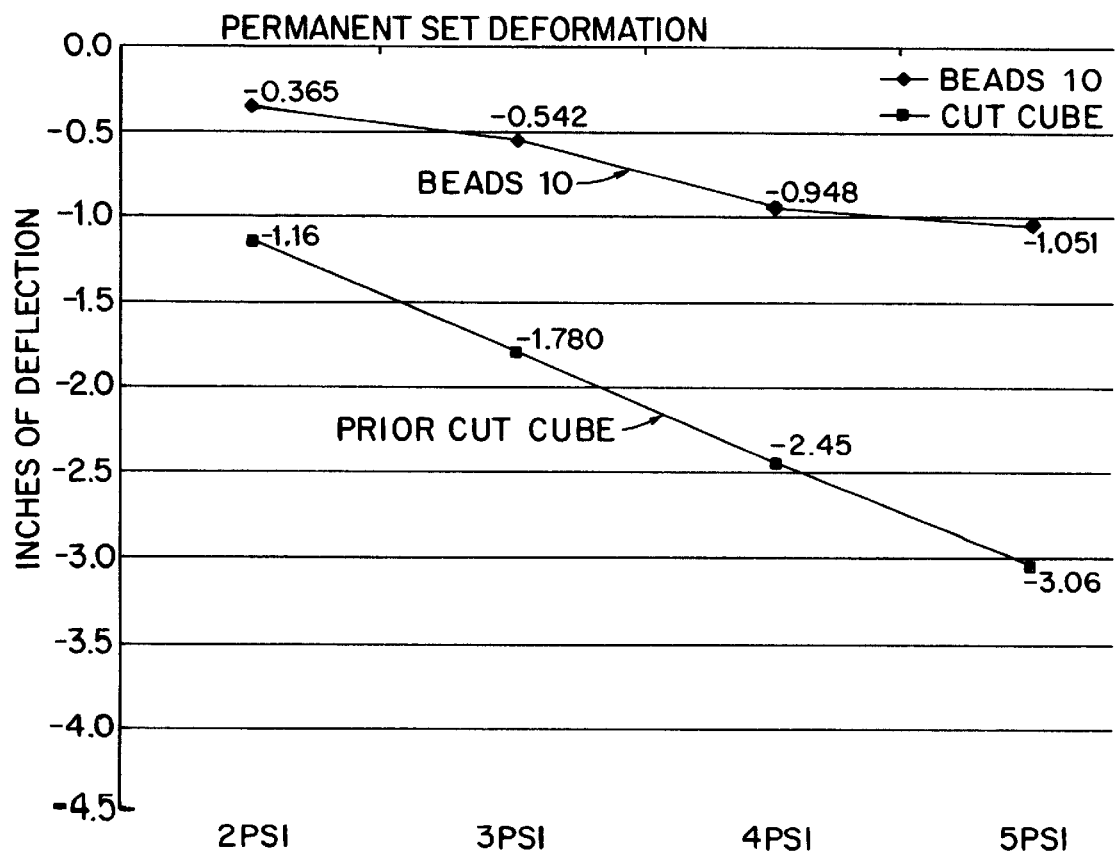

POLYSTYRENE BEADS FOR DRAINAGE FIELDS

BACKGROUND OF THE INVENTION

This invention relates generally to drainage systems and, more particularly, to polystyrene beads of novel design for use in preassembled drainage units from which drainage fields such as sewage septic fields may be constricted.

In recent years, preassembled drainage units such as those illustrated in U.S. Pat. No. 5.015,123 have been used for constructing drainage fields for effluent from sewage septic tanks, replacing the traditional plastic pipe and gravel aggregate system. Those preassembled units are generally of two types, one type including a length of perforated distribution polyethylene vent pipe surrounded by a predetermined volume of loose lightweight pieces of plastic aggregate bounded by a perforated sleeve member, the other type being conduitless and merely including the plastic aggregate contained within the sleeve. The manner in which those units are assembled to form drainage fields is described in U.S. Pat. No. 5,015,123 and that description is incorporated herein by reference.

In practice, in the preassembled units, the loose pieces of plastic aggregate are at least 1" cubes produced from blocks of expanded polystyrene 4'×4'×8' in size. The blocks are initially cut into 1" sheets, and the sheets are then dropped onto a hot wire grid and cubed into 1" cubes. However, the use of cut cubes creates some problems. Cut polystyrene cubes tend to flake and particles of polystyrene fly everywhere. Also, if vehicles drive over the drainage fields, the cut polystyrene cubes tend to collapse and the water filtration slows or stops.

Thus, there is a need for a plastic aggregate which overcomes those problems, and the novel plastic aggregate of this invention satisfies that need.

SUMMARY OF THE INVENTION

Accordingly, the primary object of the invention is to provide an expanded plastic bead of novel configuration which is strong and durable, which provides greater void space to promote the flow of waste water through the drainage units, and which provides maximum surface area for bacteria to attach to, the bacteria acting on the sewage effluent, returns it to the soil.

The objectives of the invention are accomplished by providing a configured block-like polystyrene bead made primarily from recycled polystyrene materials of low melt flow to give the bead toughness and durability. The bead is formed by extruding material through an appropriately shaped and sized extrusion die, cutting the material to form beads of a predetermined length, and heating and expanding the beads so that each of its six sides is at least one inch in size. The bead has a longitudinally extending central portion and a plurality of spaced legs, preferably at least three, extending upwardly and three spaced legs extending downwardly from the central portion. A rib projects outwardly from the central portion on each side face of the bead. Channels are formed between adjacent legs and the width of the channels is less than the width of the legs. When contained within a drainage unit, this prevents the legs of one bead from interlocking in the channels of an adjacent bead and maintains maximum void space. Similarly, the ribs on the side faces of the beads maintain spacing between adjacent beads to maximize void space. The large void space allows for maximum flow and storage of waste water. In addition, the novel bead configuration with the legs and channels provides maximum surface area for growth of bacteria which enhances the breakdown of sewage waste.

Other objectives and advantages will become apparent from reading the following description of the invention wherein reference is made to the accompanying drawings.

BRIEF DESCRIPTION OF THE DRAWINGS

FIG. 1 is a front, right side perspective view of the novel expanded polystyrene bead of the invention;

FIG. 2 is a top plan view of the bead of FIG. 1, a bottom plan view being the same.

FIG. 3 is a graph comparing the permanent set deformation under compression load of the bead of the invention with a prior art cut cube.

DETAILED DESCRIPTION OF THE INVENTION

Figure 4:
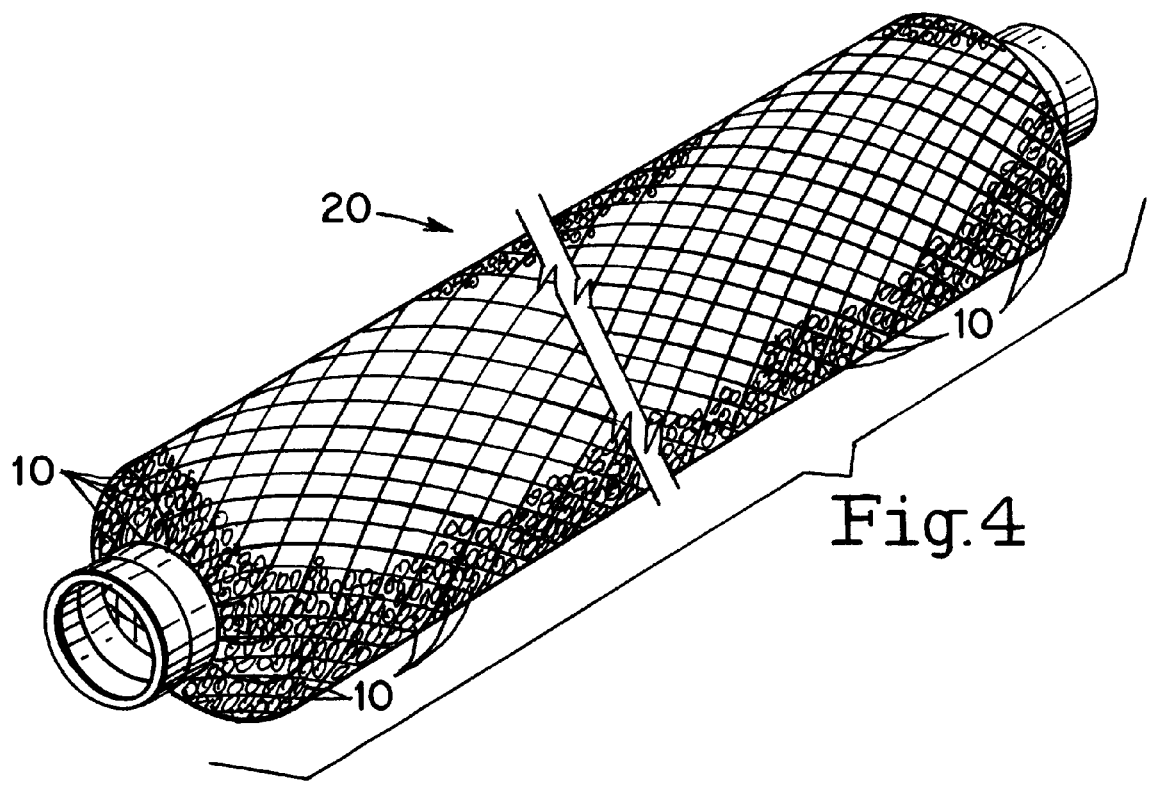
FIG. 4 is a fragmentary perspective view of a preassembled drainage unit which includes a length of perforated distribution polyethylene vent pipe surrounded by a predetermined volume of loose lightweight pieces of plastic aggregate constructed according to the invention which are bound by a perforated sleeve member.

Referring to FIGS. 1 and 2, the novel expanded bead 10 of the invention is of block like form and includes a longitudinally extending central portion 12 which is generally rectangular in both vertical and horizontal cross section, three laterally spaced legs 14 extending upwardly from the top of portion 12 with channels 16 therebetween, and three laterally spaced legs 14 extending downwardly from the bottom of portion 12 with channels 16 therebetween. A rib 18 projects laterally outwardly from each side of portion 12 and extends generally along the length of the bead.

Bead 10 is preferably made from recycled polystyrene material of low melt flow to give it toughness and durability which especially adapts it for use in drainage systems.

To comply with construction regulations for aggregates in drainage fields, the height H, width W, and length L are all at least one inch.

Figure 5:
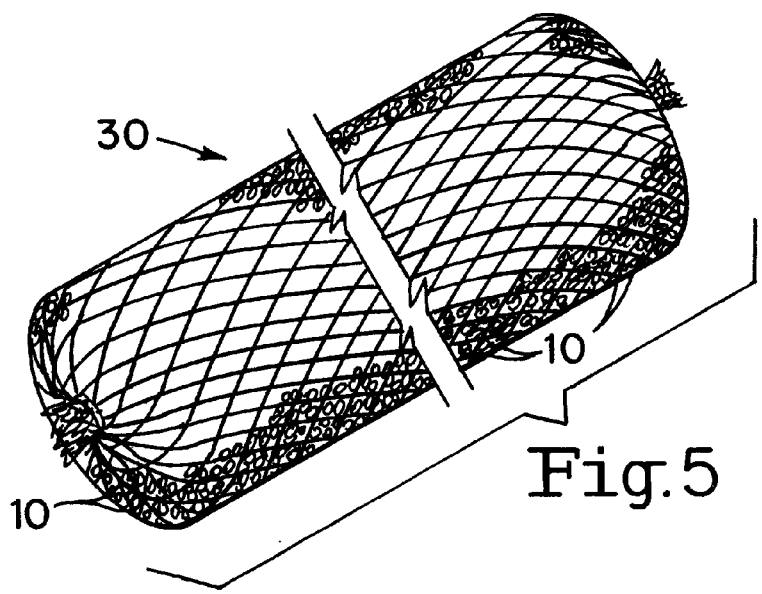

In the configuration of bead 10, for strength purposes the thickness T of central portion 12 is greater than the width $W_1$ of legs 14. Further, the width $W_1$ of legs 14 is greater than the width $W_2$ of channels 16, and preferably $W_1$ is at least double $W_2$. Similarly, the width $W_3$ of ribs 18 is greater than $W_2$. In practice, because of the nature of the recycled polystyrene material from which the beads are made and the expansion the beads undergo during the heating process, the actual dimensions of the central portion, the legs, the channels, and the ribs are not necessarily uniform throughout, but the general size relationships between those components are maintained. Consequently, when beads 10 are used as loose fill aggregate in preassembled drainage units such as units 20 and 30 illustrated in FIGS. 4 and 5 legs 14 or ribs 18 of one bead 10 can not enter and interlock with channels 16 of an adjacent bead, keeping the channels open. In addition ribs 18 of one bead engaging against any surface of an adjacent bead maintains a space between the beads. Thus, maximum void space is provided in the drainage units which allows for maximum flow and containment of waste water. Furthermore, the large void space provides maximum surface area on the beads 10 for growth of bacteria which cause the biological breakdown of sewage wastes.

In constricting a sewage drainage system, an installer will place anywhere from 6" to 24" of soil on top of the system, whether it be a preassembled unit system employing beads 10 or a conventional gravel type system. 24" of soil will weigh about 200 lbs/sq.ft. (psf) or 1.39 lbs/sq.in. (psi), a compressive load applied to beads 10. Also, vehicles may ride over the soil covering the drainage system. To ensure the stability and continued operation of the systems, regulations often require that, at a compressive load of 300 psf or 2.08 psi, they maintain a minimum of 30% void space which is approximately the value for gravel in conventional systems.

Tests have shown that the beads 10 under compression loading perform very favorably when compared to gravel and much better than the prior cut polystyrene cubes, described above. Under a load of 2.5 psi, beads 10 maintained a void space of approximately 34.5%, while the prior cut cubes tended to collapse to substantially slow the water filtration.

The graph of FIG. 3 illustrates how beads 10 of the invention resist deformation under compressive loads much better than the prior cut cubes, which helps explain why the beads 10 maintain the void space of approximately 34.5% while the prior cut cubes tend to collapse.

As mentioned above, the special configuration of beads 10 provides for maximum surface area for growth of bacteria to enhance the biological breakdown of sewage wastes. For example, the calculated surface area of a bead 10 of approximate size 1.25" cube is about 11.74 sq.in., while the surface area of a prior 1.25" cut cube is about 7.5 sq.in. Stated another way, the configured beads 10 of the invention have approximately 56% more surface area than the prior cut cubes.

The foregoing relates to preferred exemplary embodiments of the invention, it being understood that other variants and embodiments thereof are possible within the spirit and scope of the invention, the latter being defined by the appended claims.

What is claimed is:

1. A lightweight expanded plastic bead for use as aggregate in a preassembled drainage line unit, said bead comprising a solid central portion of generally rectangular cross section, a plurality of solid legs extending upwardly a substantial distance from the top of said central portion and a plurality of solid legs extending downwardly a substantial distance from the bottom of said central portion, a plurality of channels each defined by adjacent legs and each having a substantial depth, the width of said legs being greater than the width of said channels so as to prevent the legs of one bead from nesting within the channels of an adjacent bead when in use, the length of the sides of said bead being no greater than three inches.

2. The lightweight plastic aggregate bead of claim 1, comprising solid rib means protruding laterally from the sides of said central portion.

3. The lightweight plastic aggregate bead of claim 2, wherein said bead is expanded from recycled polystyrene materials of low melt flow.

4. The lightweight plastic aggregate bead of claim 1, wherein said plurality of legs extending from the top of said central portion is at least three and said plurality of legs extending from the bottom of said central portion is at least three.

5. The lightweight plastic aggregate bead of claim 1, comprising solid rib means protruding laterally from the sides of said central portion.

6. The lightweight plastic aggregate bead of claim 5, wherein said bead is expanded from recycled polystyrene materials of low melt flow.

7. A preassembled drainage line unit comprising a perforated sleeve member and a loose aggregation of lightweight plastic beads enclosed within said sleeve member, each of said beads comprising a solid central portion of generally rectangular cross section, a plurality of solid legs extending a substantial distance from the top of said central portion and a plurality of solid legs extending a substantial distance from the bottom of said central portion, a plurality of channels each defined by adjacent legs and each having a substantial depth, the width of said legs being greater than the width of said channels so as to prevent the legs of one bead from nesting within the channels of an adjacent bead.

8. The preassembled drainage line unit of claim 7, each of said beads comprising rib means prottuding laterally from the sides of said central portion.

9. The preassembled drainage line unit of claim 8, wherein each of said beads is expanded from recycled polystyrene materials of low melt flow.

10. The preassembled drainage line unit of claim 7, wherein said plurality of legs extending from the top of said central portion is at least three and said plurality of legs extending from the bottom of said central portion is at least three.

11. A lightweight expanded plastic bead for use as aggregate in a preassembled drainage line unit, said bead comprising a solid central portion of generally rectangular cross section, a plurality of solid legs extending upwardly a substantial distance from the top of said central portion and a plurality of solid legs extending downwardly a substantial distance from the bottom of said central portion, the legs extending from the top of said central portion being substantially aligned with the legs extending from the bottom thereof, a plurality of channels each defined by adjacent legs and each having a substantial depth, the width of said legs being greater than the width of said channels so as to prevent the legs of one bead from nesting within the channels of an adjacent bead when in use, the length of the sides of said bead being no greater than three inches.

12. The lightweight plastic aggregate bead of claim 11, wherein said plurality of legs extending from the top of said central portion is at least three and said plurality of legs extending from the bottom of said central portion is at least three.

13. A preassembled drainage line unit comprising a perforated sleeve member and a plurality of lightweight plastic beads enclosed within said sleeve member, each of said beads being of substantially the same configuration and comprising a solid central portion of generally rectangular cross section, a plurality of solid legs extending a substantial distance from the top of said central portion and a plurality of solid legs extending a substantial distance from the bottom of said central portion, the legs extending from the top of said central portion being substantially aligned with the legs extending from the bottom thereof, a plurality of channels each defined by adjacent legs and each having a substantial depth, the width of said legs being greater than the width of said channels so as to prevent the legs of one bead from nesting within the channels of an adjacent bead.

14. The preassembled drainage line unit of claim 13, each of said beads comprising rib means protruding laterally from the sides of said central portion.

15. The preassembled drainage line unit of claim 14, wherein each of said beads is expanded from recycled polystyrene materials of low melt flow.

16. The preassembled drainage line unit of claim 13, wherein said plurality of legs extending from the top of said central portion is at least three and said plurality of legs extending from the bottom of said central portion is at least three.

* * * * *